United States Patent

Matsuoka et al.

[11] Patent Number: 6,132,591
[45] Date of Patent: Oct. 17, 2000

[54] METHOD FOR REMOVAL OF SULFATE GROUPS AND CHLORATE GROUPS FROM BRINE

[75] Inventors: Terumi Matsuoka, Okayama; Masahiro Ohara, Kurashiki; Takamichi Kishi, Okayama, all of Japan

[73] Assignee: Chlorine Engineers Corp., Ltd., Tokyo, Japan

[21] Appl. No.: 09/198,455

[22] Filed: Nov. 24, 1998

[30] Foreign Application Priority Data

Nov. 28, 1997 [JP] Japan .................................. 9-328355

[51] Int. Cl.[7] .............................. C25B 1/34; C25B 1/00; C25B 11/04; C25C 1/00
[52] U.S. Cl. ........................ 205/516; 205/536; 205/554; 205/556; 205/617; 205/625; 205/532
[58] Field of Search .................................. 205/617, 615, 205/620, 508, 510, 512, 516, 536, 554, 556, 625, 532

[56] References Cited

U.S. PATENT DOCUMENTS

| | | | |
|---|---|---|---|
| 4,169,773 | 10/1979 | Lai et al. ................................. | 204/98 |
| 4,374,711 | 2/1983 | Ogawa ..................................... | 204/98 |
| 4,397,720 | 8/1983 | Moore et al. ............................ | 204/98 |
| 4,405,418 | 9/1983 | Takemura ................................. | 204/95 |
| 4,470,891 | 9/1984 | Moore et al. ............................ | 204/98 |
| 4,481,088 | 11/1984 | Moore et al. ............................ | 204/98 |
| 4,586,993 | 5/1986 | O'Brien .................................. | 204/98 |
| 4,702,805 | 10/1987 | Burkell et al. .......................... | 204/95 |
| 5,126,019 | 6/1992 | Rutherford et al. ..................... | 204/98 |
| 5,362,368 | 11/1994 | Lynn et al. .............................. | 204/98 |

*Primary Examiner*—Donald R. Valentine
*Attorney, Agent, or Firm*—Armstrong, Westerman, Hattori, McLeland & Naughton

[57] ABSTRACT

In removal of sulfate groups and chlorate groups from brine used for electrolysis, concentrated brine used in an electrolysis process or dilute brine whose concentration is decreased by electrolysis is fed to an anode chamber divided by a cation exchange membrane in a brine treating electrolyzer, where the concentrated or dilute brine is electrolyzed to recover chloride ions therein. The concentrated brine is electrolyzed at a rate of decomposition of salt higher than that in the ion exchange membrane electrolysis process of brine. Thereafter, the concentrated or dilute brine is discharged out of the electrolysis process.

27 Claims, 2 Drawing Sheets

METHOD FOR REMOVAL OF SULFATE GROUPS AND CHLORATE GROUPS FROM BRINE

BACKGROUND OF THE INVENTION

The present invention relates to a method for removal of sulfate groups and chlorate groups from an aqueous solution of alkaline metal chlorides.

When the aqueous solution of alkaline metal chlorides is used as the starting material for electrolysis, it is required to eliminate impurities contained in the raw material, and substances formed in the process of electrolysis. Especially when brine circulates through a closed system between a brine preparation process and an anode chamber as in electrolysis using an ion exchange process, it is known that a buildup of sulfate groups introduced from the raw material and chlorate groups formed in the anode chamber has an adverse influence on electrolysis performance, often resulting in quality drops of the resulting alkali hydroxides. It is thus inevitable to remove the sulfate groups and chlorate groups, etc. from brine.

On the other hand, chlorate groups are formed in the anode chamber during ordinary electrolysis using an ion exchange process, and then build up in brine. With the chlorate groups remaining unremoved, it is known that the concentration of chlorate ions in the brine increases, resulting in an electrolysis performance drop and a quality drop of sodium hydroxide. Thus, the chlorate groups, too, should be eliminated from the brine.

As a typical method of removing sulfate groups from brine, JP(A)60044056 discloses to remove sulfate groups from brine by means of a packed column system using a cation exchange resin containing a polymer type of hydrous zirconium hydroxide.

JP(A)03153522 discloses another method of removing sulfate groups from brine, wherein slurried zirconium hydroxide having a low water content is brought into contact with sulfate group-containing brine without being carried on a cation exchange resin to adsorb sulfate groups thereon, and the zirconium hydroxide with the sulfate groups adsorbed thereon is then transferred to another reaction vessel where it comes into contact with alkali in an aqueous solution.

Yet another method of removing sulfate groups from brine is disclosed in JP(A)60228691, wherein sulfate group-containing brine is diluted to adsorb sulfate groups on an anion exchange resin, and the anion exchange resin with the sulfate groups adsorbed thereon is then desorbed with concentrated brine, followed by crystallization and separation by cooling. This method is found to be undesirable in view of energy due to an increase in the number of steps involved.

With these sulfate group removal methods, however, it is impossible to remove sulfate groups and chlorate groups at the same time.

For chlorate group removal, a method of decomposing chlorate groups with the addition of hydrochloric acid to brine is known in the art. However, problems with this method are that much hydrochloric acid is needed and a reaction vessel for decomposing chlorate groups with hydrochloric acid has a reduced service life due to corrosion, etc. A further problem is that when chlorine dioxide formed during the decomposition of chlorates is mixed into chlorine, there is a risk of explosion, etc.

According to one approach to removing sulfate groups and chlorate groups from brine, a part of dilute brine is discharged out of a brine system and fresh salt is dissolved in the remaining brine to prepare brine for electrolysis. This approach is simple in operation, but a grave problem therewith is that a large amount of salt that is the raw material for electrolysis is rejected.

A method of fractional removal of both sulfate groups and chlorate groups by amphoteric ion exchange resin chromatography is also known in the art. Problems with the amphoteric ion exchange resin are, however, that its ability to remove them drops due to its premature degradation by poor chemical stability, and much chemicals must be used for desorption of the sulfate groups and chlorate groups upon absorption.

An object of the invention is to provide a method of separating and removing sulfate groups and chlorate groups at the same time from brine in the process of electrolysis of an aqueous solution of alkaline metal chlorides.

SUMMARY OF THE INVENTION

Figure 1:
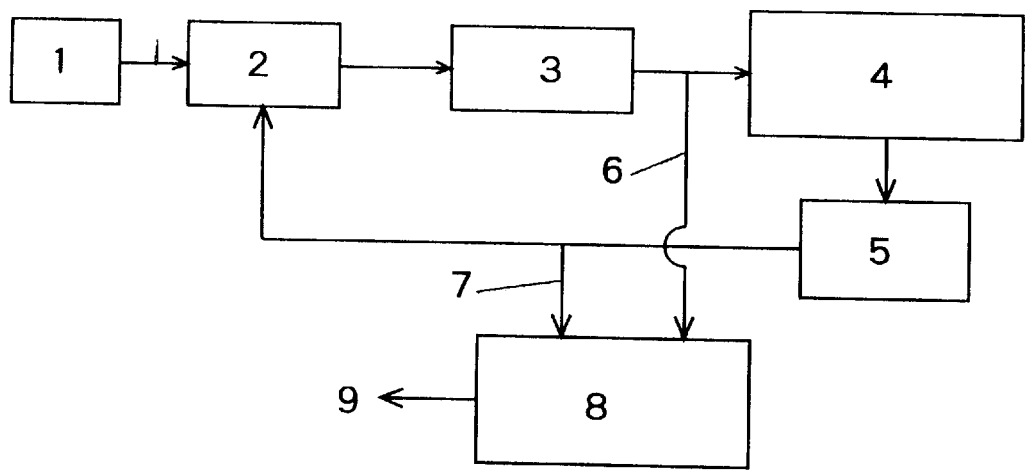
FIG. 1 is a block diagram for illustrating an electrolyzer for an ion exchange membrane electrolysis that is carried out according to the invention.

The present invention provides a method of removing sulfate groups and chlorate groups from brine, wherein concentrated brine used in an electrolysis process or dilute brine whose concentration is decreased by electrolysis is fed to an anode chamber divided by a cation exchange membrane in a brine treating electrolyzer, where said concentrated or dilute brine is electrolyzed to recover chloride ions therein, and said concentrated or dilute brine is thereafter discharged out of said electrolysis process.

According to the present method of removing sulfate groups and chlorate groups from brine, the concentrated brine is electrolyzed at a rate of decomposition of salt higher than that in the electrolysis process of brine.

DESCRIPTION OF THE PREFERRED EMBODIMENT

The present invention provides a method of removing sulfate groups and chlorate groups contained in a brine system in an ion exchange membrane electrolyzer, wherein a part of brine containing sulfate groups and chlorate groups is fed through a brine pipe in the ion exchange membrane electrolyzer to an anode chamber divided by a cation exchange membrane in a brine treating electrolyzer, where said part of brine is electrolyzed while water or an aqueous solution of sodium hydroxide is fed to a cathode chamber, chlorine is recovered from the anode chamber in the brine treating electrolyzer, and brine leaving the anode chamber in the brine treating electrolyzer is discharged out of the system, or the brine discharged out of the system is fed back to the anode chamber in the brine treating electrolyzer, and a part of the brine is discharged out of the system to let out the sulfate groups and chlorate groups together with the brine from the system.

The sulfate groups, chlorate groups, etc. present in the form of anions in the anode chamber divided by the cation exchange membrane in the ion exchange membrane electrolyzer do hardly migrate to a cathode side; only sodium ions migrate to a cathode chamber side, so that chlorine can be generated from chloride ions on an anode chamber side. Accordingly, the concentration of chloride ions in the brine in the anode chamber is so decreased by electrolysis that the concentrations of sulfate groups and chlorate groups can be increased.

According to the method of the invention, therefore, the amount of salt lost in association with the discard of brine can be smaller as compared with the case where, for simultaneous removal of sulfate groups and chlorate groups, brine is discharged directly from the system via a brine feed pipe.

For the brine treating electrolyzer to which the method of the invention is applied, reliance may be placed upon an electrolyzer ordinarily used with the ion exchange membrane electrolysis of salt. For instance, use may be made of a filter press type electrolyzer or a box type electrolyzer.

For the cation exchange membrane, use may be made of a perfluoro type ion exchange membrane. For the anode, an electrode comprising an insoluble substrate and an catalyst layer containing a platinum group metal or an oxide thereof, which is coated thereon. For the cathode, use may be made of an electrode comprising a substrate such as iron, nickel, and stainless, optionally with a catalyst layer coated thereon, which may contain a platinum group metal or a compound thereof, a nickel compound, etc.

In the present invention, the rate of decomposition of salt in the anode chamber in the brine treating electrolyzer should preferably be at least 50%. The rate of decomposition of salt referred to herein is found by subtracting the amount of salt in the dilute brine discharged from the anode chamber from the amount of salt contained in the brine fed in the form of an anode solution. A high rate of decomposition of salt is preferable when the brine fed to the brine treating electrolyzer is concentrated brine having a concentration of 25 to 26%, while a low rate of decomposition of salt is preferable when the brine has a low concentration of 17 to 19%. A rate of decomposition of salt of lower than 50% is not preferable because the concentration of salt in the brine discharged out of the system is high, and so the amount of salt discharged along with sulfate groups and chlorate groups increases. An increase in the rate of decomposition of salt gives rise to a decrease in the concentration of salt in the anode solution, often resulting in problems such as a performance drop of the cation exchange membrane, premature degradation of the anode, etc. It is desired that the rate of decomposition of salt be determined depending on the performance of the cation exchange membrane and the performance of the anode.

For the brine fed to the anode chamber in the brine treating electrolyzer, concentrated brine purified in the brine treating process or dilute brine discharged upon electrolysis in the cation exchange membrane electrolyzer may be used. To keep the composition of the anode solution in the brine treating electrolyzer uniform, it is preferable that the anode solution circulates through the electrolyzer. In this case, the brine circulates through the brine treating electrolyzer via a circulation tank connected thereto by way of a pipe. More specifically, concentrated or dilute brine is fed from the ion exchange membrane electrolysis process into the pipe. Then, the brine can be discharged out of the system via a pipe for feeding the brine from the anode chamber in the brine treating electrolyzer to the circulation tank.

It is known that an increase in the pH of the anode chamber divided by the cation exchange membrane causes an increase in the concentration of oxygen in the gas generated. When the concentration of oxygen in chlorine is an issue, however, it is preferable to add hydrochloric acid to the anode solution, thereby regulating its pH to a given value.

When the method of the invention is applied to the brine treating electrolyzer, brine may be continuously fed from the brine pipe to the ion exchange membrane electrolyzer for electrolysis while the brine is continuously discharged out of the system. Alternatively, brine may be fed to the electrolyzer at any desired time interval, so that after the rate of decomposition of salt reaches the desired value, the operation of the system is shut down to discharge the treated brine out of the system.

Further, it is preferable to dechlorinate the brine discharged out of the brine treating electrolyzer because chlorine is dissolved therein.

In what follows, the present invention is explained with reference to the drawings.

FIG. 1 is a block diagram that illustrates one embodiment of the electrolzyer system in which the method of the invention is applied to an ion exchange membrane electrolysis process.

In the ion exchange membrane electrolysis process, raw salt 1 is dissolved in a dissolver 2 to obtain a saturated salt solution. At a brine purification step 3 polyvalent metal components, polyvalent anions, etc. are removed from the brine, and the brine is then fed to an anode chamber in an ion exchange membrane electrolyzer 4 for electrolysis. Thereafter, chlorine is removed from the dilute brine taken out of the electrolyzer, using a dechlorinator 5. This brine is fed back to the dissolver 2 where the next raw material is dissolved therein.

Purified brine 6 obtained at the brine purification step or dilute brine 7 obtained from the dechlorinator, in which the raw salt is to be dissolved, is fed to a brine treating electrolyzer 8 for removing sulfate groups and chlorate groups therefrom according to the invention. At the time the rate of decomposition of salt reaches the desired value, the thus treated dilute brine 9 is discharged out of the system.

Figure 2:
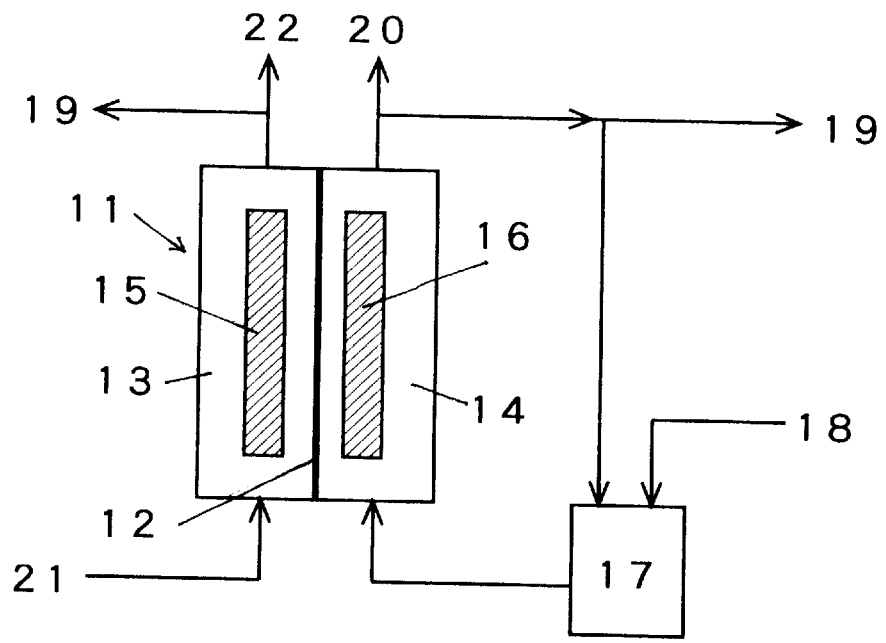
FIG. 2 is a view for illustrating a remover system for removing sulfate groups and chlorate groups according to the invention.

FIG. 2 is a schematic of one embodiment of the remover system for removing sulfate groups and chlorate groups according to the invention.

The remover system through which no brine circulates is illustrated in FIG. 2. A brine treating electrolyzer 11 is divided by a cation exchange membrane 12 into an anode chamber 13 and a cathode chamber 14. The anode chamber is provided therein with an anode 15 comprising an electrode substrate and a catalyst layer coated thereon, which layer contains a platinum group metal or an oxide thereof, and the cathode chamber 14 is provided therein with a cathode 16 comprising a nickel substrate and Raney nickel coated thereon. A cathode solution circulates through the cathode chamber via a cathode solution circulation tank 17 to which water 18 is supplied, and out of which an aqueous solution of sodium hydroxide 19 having a given concentration is taken together with hydrogen 20.

Brine is fed from an ion exchange membrane electrolysis step 21 to the anode chamber 13 where chloride ions are recovered as chlorine 22 therefrom by electrolysis, and whence treated dilute solution 23 having a desired rate of decomposition of salt is discharged out of the system, thereby removing sulfate groups and chlorate groups built up in the brine at the ion exchange membrane electrolysis step.

Figure 3:
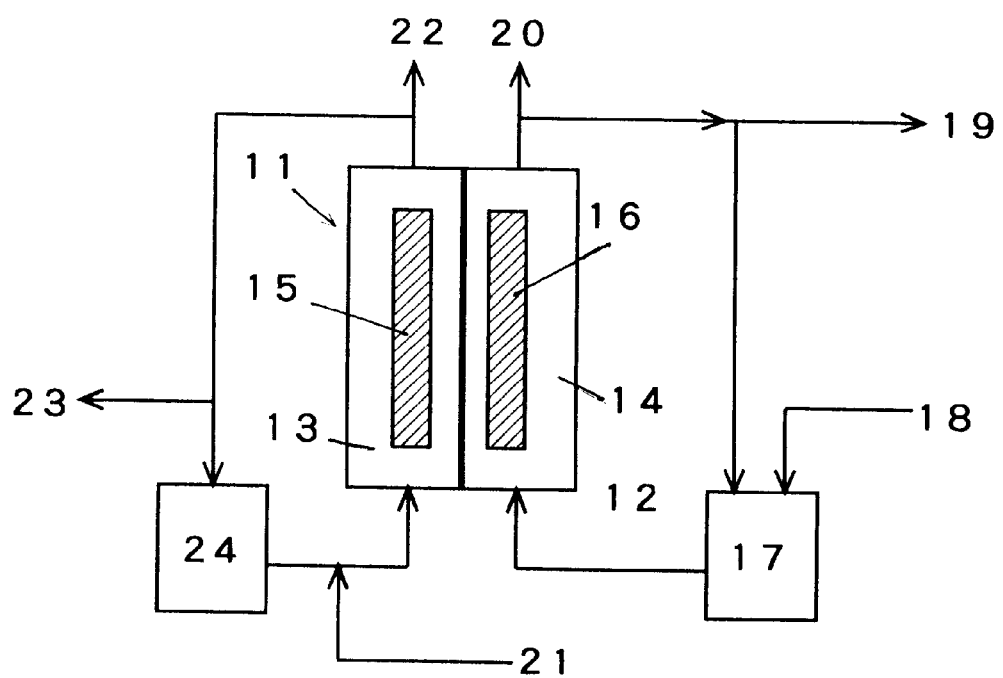
FIG. 3 is a view for illustrating a system through which brine circulates.

FIG. 3 is a schematic of another embodiment of the remover system for removing sulfate groups and chlorate groups according to the invention, through which system brine circulates.

From a brine circulation tank 24 brine is fed to an anode chamber 13 in a brine treating electrolyzer 11, while an anode solution discharged out of the anode chamber circulates through a pipe located between the anode chamber 13 and a brine circulation tank 24. Brine from an ion exchange membrane electrolysis process 21 is added to the brine fed from the brine circulation tank 24 to the anode chamber, and then fed to the anode chamber where the brine is treated in the same manner as in the remover system shown in FIG. 2.

Chloride ions in the brine are recovered as chlorine 22. Then, at the time the thus treated dilute brine 23 has a desired rate of decomposition of salt, it is supplied to the pipe extending from the anode chamber to the brine circulation tank or discharged out of the brine circulation tank, thereby removing sulfate groups and chlorate groups built up in the brine the ion exchange membrane electrolysis process.

EXAMPLE

The present invention will now be explained with reference to some examples.

Examples 1 to 5

A brine treating system having the same structure as shown in FIG. 3 was set up.

A brine treating electrolyzer was a two-chamber electrolyzer having a current-carrying area of 100 cm$^2$, which was divided by a cation exchange membrane (Naphion 350 made by Du Pont) into an anode chamber and a cathode chamber. For the anode an insoluble electrode for salt electrolysis (made by Pelmereck Co., Ltd.) was used, and for the cathode an electrode coated thereon with a Raney nickel layer was used. While the anode, ion exchange membrane and cathode were in close contact with one another, a 30 A current was passed through the electrolyzer. While an anode solution circulated through the anode via a brine circulation tank at a flow rate of 1 liter/hour, concentrated brine ( 310 g/l NaCl, 5 g/l Na$_2$SO$_4$, and 5 g/l NaClO$_3$) treated with a chelate resin was fed to a pipe extending from the circulation tank to the anode chamber. An amount of hydrochloric acid was added to the brine circulation tank in such a manner that the anode solution had a pH value of 2.3±0.2. A cathode solution circulated through a cathode chamber via a cathode solution circulation tank at a flow rate of 1 liter/hour, to which pure water was added. The electrolyzer was run in such a manner that an aqueous solution of sodium hydroxide had a concentration of 10 to 12% by weight. Electrolysis was carried out at varying rates of decomposition of salt. The results of electrolysis are shown in terms of the rate of decomposition of salt vs. composition of dilute brine relation, as reported in Table 1. The salt composition ratio referred to below is found by the ratio of salt concentration with respect to the total concentration of sodium sulfate and sodium chlorate.

TABLE 1

| | Composition of Dilute Brine | | | Salt | |
|---|---|---|---|---|---|
| | Salt (g/l) | Na$_2$SO$_4$ (g/l) | NaClO$_3$ (g/l) | Composition Ratio | Rate of Decomposition of Salt (%) |
| Ex. 1 | 54 | 43 | 44 | 0.62 | 98 |
| Ex. 2 | 93 | 37 | 38 | 1.42 | 96 |
| Ex. 3 | 123 | 33 | 33 | 1.86 | 94 |

TABLE 1-continued

| | Composition of Dilute Brine | | | Salt | |
|---|---|---|---|---|---|
| | Salt (g/l) | Na$_2$SO$_4$ (g/l) | NaClO$_3$ (g/l) | Composition Ratio | Rate of Decomposition of Salt (%) |
| Ex. 4 | 147 | 30 | 30 | 2.45 | 92 |
| Ex. 5 | 166 | 27 | 27 | 3.07 | 90 |

Examples 6 to 10

With the exception that dilute brine consisting of 200 g/l NaCl, 7 g/l Na$_2$SO$_4$ and 7 g/l NaClO$_3$ was fed to the brine treating electrolyzer, the brine was treated in the same manner as in Example 1. The results are reported in Table 2.

TABLE 2

| | Composition of Dilute Brine | | | Salt | |
|---|---|---|---|---|---|
| | Salt (g/l) | Na$_2$SO$_4$ (g/l) | NaClO$_3$ (g/l) | Composition Ratio | Rate of Decomposition of Salt (%) |
| Ex. 6 | 43 | 15 | 16 | 1.39 | 90 |
| Ex. 7 | 51 | 14 | 14 | 1.82 | 88 |
| Ex. 8 | 61 | 14 | 14 | 2.18 | 85 |
| Ex. 9 | 77 | 13 | 14 | 2.85 | 80 |
| Ex. 10 | 91 | 12 | 13 | 3.64 | 75 |

Since, according to the invention, sulfate groups and chlorate groups in the brine are treated in the anode chamber divided by the ion exchange membrane in the electrolyzer, the sulfate groups and chlorate groups can be concentrated. It is thus possible to make the amount of salt discharged smaller as compared with a conventional method wherein brine containing sulfate groups and chlorate groups is discharged out of the brine system, and dispense with a step of decomposing the chlorate groups with hydrochloric acid.

What we claim is:

1. A process of removing sulfate groups and chlorate groups built up in a brine electrolyzing system comprising:
    providing an ion exchange membrane electrolyzer having an anode chamber and a cathode chamber separated by a cation exchange membrane;
    feeding brine into the anode chamber;
    electrolyzing the brine a first time;
    recovering chlorine ions resulting from the electrolyzing of the brine;
    discharging a remaining dilute solution of brine high in concentration of sulfate groups and chlorate groups; and
    electrolyzing the discharged dilute solution of brine a second time to further remove the sulfate groups and the chlorate groups from the brine.

2. The process of claim 1 wherein brine is purified by removing metal components and polyvalent ions prior to feeding the brine into the anode chamber.

3. The process of claim 1 wherein the rate of decomposition of salt in the brine in the anode chamber is 50%, calculated by subtracting the amount of salt in the discharged dilute solution of brine from the amount of salt in the brine fed into the anode chamber.

4. The process of claim 1 wherein the ion exchange membrane electrolyzer is a electrolyzer selected from the group consisting of a filter press electrolyzer and a box electrolyzer.

5. The process of claim 1 wherein the ion exchange membrane electrolyzer has a perfluoro membrane.

6. The process of claim 1 wherein an anode of the ion exchange membrane electrolyzer is an electrode having an insoluble substrate and a catalyst layer containing a platinum group metal or oxide of a platinum coated thereon.

7. The process of claim 1 wherein a cathode of the ion exchange membrane electrolyzer is an electrode comprising a substrate selected from the group consisting of iron, nickel and stainless and optionally having a catalyst layer containing a platinum group metal coated thereon.

8. The process of claim 1 wherein the dilute solution of brine is further dechlorinated after being discharged from the anode chamber.

9. The process of claim 1 wherein after feeding the brine into the anode chamber the brine is circulated through the ion exchange membrane electrolyzer.

10. The process of claim 1 wherein an anode solution in the anode chamber is circulated in the ion exchange membrane electrolyzer to keep the anode solution uniform.

11. A process of simultaneously removing sulfate groups and chlorate groups built up in a brine electrolyzing system comprising:
providing an ion exchange membrane electrolyzer having an anode chamber and a cathode chamber separated by a cation exchange perfluoro membrane;
purifying the brine by removing metal components and polyvalent ions;
feeding the purified brine into the anode chamber;
electrolyzing the brine a first time;
recovering chlorine ions resulting from the electrolyzing of the brine;
discharging a remaining dilute solution of brine high in concentration of sulfate groups and chlorate groups;
dechlorinating the dilute solution of the brine;
electrolyzing the discharged dilute solution of brine a second time to simultaneously remove sulfate groups and chlorate groups from the brine,
removing the sulfate groups and the chlorate groups from the dilute solution of brine; and
discharging the remaining brine solution;
wherein decomposition of salt in the brine in the anode chamber is 50%, calculated by subtracting the amount of salt in the discharged dilute solution of brine from the amount of salt in the brine fed into the anode chamber.

12. The process of claim 11 wherein the ion exchange membrane electrolyzer is a electrolyzer selected from the group consisting of a filter press electrolyzer and a box electrolyzer.

13. The process of claim 11 wherein an anode of the ion exchange membrane electrolyzer is an electrode having an insoluble substrate and a catalyst layer containing a platinum group metal or oxide of a platinum coated thereon.

14. The process of claim 11 wherein a cathode of the ion exchange membrane electrolyzer is an electrode comprising a substrate selected from the group consisting of iron, nickel and stainless and optionally having a catalyst layer containing a platinum group metal coated thereon.

15. The process of claim 11 wherein after feeding the brine into the anode chamber the brine is circulated through the ion exchange membrane electrolyzer.

16. The process of claim 11 wherein an anode solution in the anode chamber is circulated in the ion exchange membrane electrolyzer to keep the anode solution uniform.

17. A process of simultaneously removing sulfate groups and chlorate groups built up in a brine electrolyzing system comprising:
providing an ion exchange membrane electrolyzer having an anode chamber and a cathode chamber, having a Raney nickel coated cathode, separated by a cation exchange perfluoro membrane;
treating brine with a chelate resin;
feeding the purified brine into the anode chamber;
circulating the purified brine in the ion exchange membrane electrolyzer;
electrolyzing the brine a first time;
recovering chlorine ions resulting from the electrolyzing of the brine;
discharging a remaining dilute solution of brine high in concentration of sulfate groups and chlorate groups;
electrolyzing the discharged dilute solution of brine a second time to simultaneously remove sulfate groups and chlorate groups from the brine,
removing the sulfate groups and the chlorate groups from the dilute solution of brine; and
discharging the remaining brine solution;
wherein decomposition of salt in the brine in the anode chamber is 50%, calculated by subtracting the amount of salt in the discharged dilute solution of brine from the amount of salt in the brine fed into the anode chamber.

18. A process of removing sulfate groups and chlorate groups built up in a brine electrolyzing system during electrolysis, comprising:
feeding a dilute solution of brine, having a concentration reduced by electrolysis of a concentrated brine, into an anode chamber separated by a cation exchange membrane in a brine electrolyzer;
electrolyzing the dilute solution of brine;
recovering chlorine ions in the dilute solution of brine; and
discharging the remaining brine in the anode chamber from the electrolyzer thereby removing the sulfate and chlorate groups.

19. The process of claim 18 wherein brine is purified by removing metal components and polyvalent ions prior to feeding the brine into the anode chamber.

20. The process of claim 18 wherein the rate of decomposition of salt in the brine in the anode chamber is 50%, calculated by subtracting the amount of salt in the discharged dilute solution of brine from the amount of salt in the brine fed into the anode chamber.

21. The process of claim 18 wherein the ion exchange membrane electrolyzer is a electrolyzer selected from the group consisting of a filter press electrolyzer and a box electrolyzer.

22. The process of claim 18 wherein the cation exchange membrane electrolyzer has a perfluoro membrane.

23. The process of claim 18 wherein an anode of the cation exchange membrane electrolyzer is an electrode having an insoluble substrate and a catalyst layer containing a platinum group metal or oxide of a platinum coated thereon.

24. The process of claim 18 wherein a cathode of the cation exchange membrane electrolyzer is an electrode comprising a substrate selected from the group consisting of iron, nickel and stainless and optionally having a catalyst layer containing a platinum group metal coated thereon.

25. The process of claim 18 wherein the dilute solution of brine is further dechlorinated after being discharged from the anode chamber.

26. The process of claim 18 wherein after feeding the brine into the anode chamber the brine is circulated through the cation exchange membrane electrolyzer.

27. The process of claim 18 wherein an anode solution in the anode chamber is circulated in the ion exchange membrane electrolyzer to keep the anode solution uniform.

\* \* \* \* \*